United States Patent Office 3,322,646
Patented May 30, 1967

3,322,646
METHOD FOR PREPARING L-GLUTAMIC ACID
Yoshio Kawai, Zushi-shi, Teijiro Uemura and Yasuo Kawai, Tokyo, and Shinji Okumura, Yokohama, Japan, assignors to Sanko Co., Inc., Kanagawa-ken, Japan, a corporation of Japan
No Drawing. Filed Oct. 30, 1964, Ser. No. 407,863
Claims priority, application Japan, Nov. 2, 1963, 38/58,580
4 Claims. (Cl. 195—29)

The present invention relates to a method for preparing L-glutamic acid biochemically with the use of pyrrolidonecarboxylic acid as a raw material. Pyrrolidonecarboxylic acid (abbreviated hereinafter as PCA) is prepared by means of organic synthesis, extraction from natural materials, intramolecular dehydrating reaction of glutamic acid, and so on. It has been known that L-glutamic acid, which is obtained by hydrolytic conversion of PCA is commercially useful.

However, according to the ordinary process, L-PCA is converted to L-glutamic acid, and D-PCA is converted to D-glutamic acid, and DL-PCA is converted to DL-glutamic acid, respectively. Accordingly, in order to obtain L-glutamic acid from D-PCA or DL-PCA, another process such as optical resolution or racemization is necessary besides the conversion process.

An object of the present invention is to provide a method for preparing L-glutamic acid in one stage from D-PCA or DL-PCA in high yield eliminating the troublesome process mentioned above.

This object of the present invention is achieved by contacting D-PCA and/or DL-PCA with a microorganism as an enzymic agent in an aqueous medium having a pH range of 5–10 in the presence of air and within a temperature range of 25–60° C.

It is assumed that both the reactions of hydrolysis and optical racemization occur simultaneously during this biochemical reaction in the present invention according to which L-glutamic acid is prepared from D-PCA and/or DL-PCA. Although the detailed mechanism is scientifically not yet understood, it is a fact that only L-glutamic acid is produced without any trace of D-glutamic acid. In addition, L-glutamic acid is, of course, easily produced from L-PCA when it exists in the reaction system of this invention.

The technique reported in The Journal of Biochemistry, vol. 43, No. 3, pages 327–335 (1956), for example, is known by means of which PCA is metabolized by Pseudomonas. However, this report describes only that 0.04 g./dl. of L-glutamic acid was produced in aqueous solution of 0.4% L-PCA by strains of genus Pseudomonas and no description concerning metabolism of D-PCA is found therein. The present invention based on the entirely new concept as mentioned above and therefore provides a significant and novel method for preparing L-glutamic acid.

Most of the microorganisms employed in the method of the present invention are the strains which belong to the family Achromobacteriaceae, Micrococcaceae, Brevibacteriaceae, Corynebacteriaceae, Enterobacteriaceae, Pseudomonadaceae, Bacillaceae, Rhizobiceae, and they can be easily obtained in nature and from cultures. However, any microorganism which can metabolize D-PCA to L-glutamic acid may be employed in this invention even if it does not belong to any of these families. The following test method is adopted in the present invention in order to determine whether a microorganism may be employed or not.

1 ml. of a suspension of intact cells corresponding to 0.5–10 mg. dried cells is mixed with 1 ml. of buffer solution of potassium phosphate, having a pH range of 6–9, containing 20 mg. of D-PCA supplied as its ammonium salt, and the mixture is shaken slowly for 12–72 hours at a temperature of 30° C. In this case, any microorganism which is capable of producing at least 0.5 mg. of L-glutamic acid in the reaction mixture may be employed advantageously in the present invention.

Illustrative typical microorganisms which are qualified by this test are:
*Agrobacterium radeobacter* ATCC 6466,
*Pseudomonas saccharophila* ATCC 9114,
*Pseudomonas alkaligenes* ATCC 12815,
*Achromobacter* sp. S-4 IAM 1010,
*Brevibacterium sulfureum* IPR AU-38,
*Bacillus megatherium* 6045, Q-11 and G-17-4, and
*Arthrobacter citreus* No. 23-2A.

Of those mentioned above, Achromobacter sp. S-4 IAM 1010 is described as Micrococcus 8-4 in The Journal of the Agricultural Chemical Society of Japan, vol. 28, p. 635 (1954), and is determined by our laboratory's identification as a strain of genus Achromobacter. *Brevibacterium sulfureum* IPR. AU-38 is a stock culture of The Institute of Food Bacteriology, Chiba University in Japan, and *Bacillus megatherium* 6045, Q-11 and G-17-4, and *Arthrobacter citreus* No. 23-2A are strains isolated by us.

The bacteriological charactertistics and classification of *Arthrobacter citreus* No. 23-2A as found by the present inventors are provided below.

*Arthrobacter citreus* 23-2A (1) Rods, 0.6 by 1.0 to 4 microns. The rods rapidly undergo fragmentation, usually within 24 hours, to give rise to coccoid forms 0.7 micron in diameter. Feebly motile by means of peritrichous flagella within 24 hours.
(2) Gram variable.
(3) Spore not formed.
(4) Nutrient agar colonies: circular, low convex, entire, smooth, glistening, opaque, butyrous, light gray to lemon yellow after one week.
(5) Nutrient agar slant: Growth moderate, filiform, opaque, light gray to lemon yellow.
(6) Glutamate agar slant: Slight growth.
(7) Nutrient broth: M o d e r a t e l y turbid. No surface growth.
(8) Nutrient gelatin stab: No liquefaction.
(9) Milk: Unchanged, but color of medium becomes slightly pink after 8 days.
(10) BCP milk: Alkaline
(11) Nitrites produced from nitrates.
(12) Nitrate respiration: Negative
(13) No acid from glycerol, xyrose, glucose, sucrose, lactose and starch in peptone media.
(14) According to Hugh and Leifeson's method, acid but no gas is aerobically produced from glucose, but not from lactose. No acid or gas is anaerobically produced from glucose and lactose.
(15) Starch not hydrolyzed.
(16) Acetylmethylcarbinol not produced.
(17) Methyl red: Negative.
(18) Optimum temperature for growth: Between 25° and 30°. Grows at 15°. Scanty or none growth at 37°.
(19) Catalase: Positive.
(20) Aerobic.
(21) Source: Soil.

The isolate was identical with the standard description of *Arthrobacter citreus* (Sacks) except for liquefaction of gelatin.

According to the present invention, the biochemical process in which PCA is converted to glutamic acid may be carried out in various manners. For instance, a microorganism used is incubated in a nutrient medium containing a favorable amount of PCA under aeratic condition if necessary, and then in this culture medium a conversion reaction of PCA to L-glutamic acid can be carried out by the enzyme formed by the grown cells. In another way, a microorganism is inoculated and cultured in a nutrient medium which may or may not contain a small amount of PCA and when the microorganism grows considerably and the enzymes required are formed, PCA is added to this culture medium and this mixture is incubated for the conversion reaction. In this case, instead of direct contact of the microbial culture with PCA, viable cells are separated from the culture by centrifugation, and cell homogenates obtained from the culture or cell extracts from the homogenate are contacted with PCA. In addition, L-glutamic acid can be obtained in high yield when the reaction is carried out under the suitable adjustment of the pH by successive addition of small amounts of PCA. The pH for the conversion reaction is between 5 and 10, preferably 7 and 9, and the temperature is between 25° and 60° C., preferably 25° and 40° C.

As a nutrient medium, ordinary synthetic or natural culture medium may be used, and a suitable one is selected according to the microorganism used or the form of the reaction. In general, there are used nutrient media composed of carbon-source, nitrogen-source, inorganic salt and a very small amount of organic material. Culture is advantageously carried out at a pH of 5–9, preferably 7–9, at a temperature of 25–50° C., preferably 25–40° C., for 10–124 hrs. Usually liquid culture is employed, but surface culture on solid medium may be carried out if necessary circumstances require.

PCA is the main raw material in this invention and its form is as follows. Any one of free acids, salts and their mixtures of D–PCA and/or DL–PCA can be employed. Accordingly, the ammonium salt of PCA prepared from organic synthesis or its reaction product containing PCA may be used directly for this invention.

The concentration of raw material PCA in aqueous medium for conversion reaction, is suitable in the range of 0.5–50%.

L-glutamic acid produced in the reaction liquid can be easily separated by ordinary means such as the concentration method, the precipitation method at the isoelectric point, and treatment with the use of ion-exchange resins.

In the conversion reaction of PCA to L-glutamic acid, the yield reaches 80–90% (wt.) under the most advantageous conditions.

For the purpose of illustration only, this invention will now be illustrated by the following examples. Of course, this invention shall not be limited to the following examples.

EXAMPLE 1

A nutrient medium having the following composition was prepared of which the pH was adjusted to 7 with the addition of aqueous ammonia:

| | |
|---|---|
| Glucose _____percent__ | 1 |
| Powder of amino acids [1] _____do____ | 0.5 |
| Yeast extract _____do____ | 0.2 |
| $KH_2PO_4$ _____do____ | 0.1 |
| $MgSO_4 \cdot 7H_2O$ _____do____ | 0.04 |
| Fe-ion _____p.p.m.__ | 2 |
| Mn-ion _____p.p.m.__ | 2 |
| DL–PCA _____percent__ | 0.2 |

[1] Powder of amino acids is composed of the concentrated residual various amino acids prepared by eliminating the greater part of L-glutamic acid from the hydrolyzed product of soybean proteins with the use of hydrochloric acid. This material contains L-glutamic acid in an amount of 6.5% and is a well-nourished source for microorganisms.

After 50 cc. of this medium was charged in a 500 cc. volume flask and shaken and sterilized, cells grown on bouillon agar slant of various microorganisms as cited in Table I were inoculated in the above medium and incubated aerobically with shaking at 30° C. for 18–24 hrs.

Cells were harvested by centrifugation from the culture broth and suspended in a physiological saline. This suspension of cells had 0.3–0.8 as determined turbidometrically in absorbance at 562 mμ with using 26 times diluted solution.

1 cc. of this suspension of cells were mixed with 1 cc. of aqueous solution of $\frac{3}{16}M-K_2HPO_4$ (adjusted to pH 8.5 by phosphoric acid) and 1 cc. of 3% aqueous solution of L–PCA (adjusted to pH 8.5 by $NH_4OH$), and the mixture was then charged in a test tube. The test tube was maintained vertically and shaken for 48 hrs. at 120 r.p.m. on a reciprocal shaker (7 cm. in amplitude of shaking). During this process, the temperature was maintained at 31° C. and air was slowly introduced into the liquid. All operations were carried out under sterile conditions. In the same manner, the conversion reaction was further carried out employing 1 cc. of 3% aqueous solution of D–PCA or 1 cc. of 3% aqueous solution of DL–PCA, respectively.

Production of glutamic acid in the reaction liquid could be recognized qualitatively by means of paper-chromatography. L-glutamic acid produced in each of the above three reaction liquids was determined with the use of L-glutamic acid decarboxylase of *E. coli* Crooks. The results are illustrated in Table 1.

TABLE 1

| Microorganism | Yield of L-glutamic acid produced from raw material PCA used (wt. percent), in the case of— | | |
|---|---|---|---|
| | L–PCA | D–PCA | DL–PCA |
| *Agrobacterium radeobacter* ATCC 6466 | 8.4 | 9.9 | 6.9 |
| *Pseudomonas saccharophila* ATCC 9114 | 21.8 | 20.4 | 24.0 |
| *Pseudomonas alkaligenes* ATCC 12815 | 15.3 | 16.3 | 15.7 |
| *Brevibacterium sulfureum* IPR. AU-38 | 32.8 | 35.6 | 35.6 |
| *Arthrobacter citreus* No. 23-2A | 19.2 | 14.4 | 17.0 |

From the table cited above, it is found that L-glutamic acid can be produced from any of L–PCA, D–PCA, and DL–PCA by each bacterium cited in the table. In addition, production of D-glutamic acid was not found at all in this case.

EXAMPLE 2

A nutrient medium of the following composition was prepared and adjusted to a pH of 7 by aqueous ammonia:

| | |
|---|---|
| DL–PCA _____percent__ | 3 |
| $PH_2PO_4$ _____do__ | 0.1 |
| $MgSO_4 \cdot 7H_2O$ _____do__ | 0.04 |
| Fe-ion _____p.p.m__ | 2 |
| Mn-ion _____p.p.m__ | 2 |
| Aji-Eki (trade name in Japan, T–N 2.4%, made by the hydrolysis of defatted soybean) ____cc./dl__ | 0.5 |
| Yeast extract _____percent__ | 0.02 |
| Glucose _____do__ | 0.2 |
| Biotin _____γ/l__ | 2 |
| Mixture of vitamin B group _____ Small amount | |

3 cc. of this medium was charged in a test tube, sterilized, and then inoculated with cells of each kind of microorganism given in Table 2. Each inoculated medium was aerobically incubated at 31° C. for 48 hrs. with continuous shaking. L-glutamic acid produced in the medium was determined in the same manner as in Example 1, and the results obtained are illustrated in Table 2. The amount of cell growth described in the table was calculated by determining absorbance at 562 mμ of 26 times diluted medium.

TABLE 2

| Microorganism | Amount of cell growth (1./log T) | L-glutamic acid produced | |
|---|---|---|---|
| | | Concentration in medium (g./dl.) | Yield from raw material PCA used (wt. percent) |
| Agrobacterium radeobacter ATCC 6466 | 0.08 | 0.20 | 6.7 |
| Pseudomonas saccharophila ATCC 9114 | 0.09 | 0.40 | 13.3 |
| Pseudomonas alkaligenes ATCC 12815 | 0.110 | 0.35 | 10.2 |
| Achromobacter sp. IAM 1010 | 0.100 | 0.20 | 6.7 |
| Brevibacterium sulfureum IPR. AU-38 | 0.150 | 0.35 | 11.7 |
| Arthrobacter citreus No. 23-2A | 0.290 | 0.15 | 5.0 |

EXAMPLE 3

A similar nutrient medium as cited in Example 2 was preferred except that the content of DL–PCA was changed to 2% and the medium was adjusted to a pH of 7. After 20 cc. of this medium was charged in a 500 cc. volume flask and sterilized by heating at 110° C. for 2 min., the cells grown on bouillon slant of *Pseudomonas alkaligenes* ATCC 12815 were inoculated and incubated aerobically at 31° C. with shaking in the same manner as described in Example 1.

A part of the DL–PCA added was metabolized as the bacterium grew, and as a result, the pH of the medium was raised gradually and reached 8.5 (determined by using phenol red test paper) after 20 hrs. 50 mg. of DL–PCA was then added to the flask for the purpose of both lowering the pH to 7.6 and further metabolizing it. The incubation was thereafter continued aerobically with shaking. The addition of DL–PCA, thus, was useful to lowering pH of the medium, and during the course of the incubation thereafter a suitable amount of DL–PCA as shown in Table 3 was further added to the culture medium as the pH was raised.

TABLE 3

| The time elapsed (hr.) | Added amount of DL-PCA (mg) | pH before the addition of DL-PCA | pH after the addition of DL-PCA |
|---|---|---|---|
| 25 | 30 | 8.3 | 7.5 |
| 37 | 80 | 8.5 | 8.3 |
| 40 | 80 | 8.5 | 7.8 |
| 44 | 50 | 8.6 | 7.9 |

After passage of 48 hrs., it was determined that 2.05 g./dl. of L-glutamic acid was produced in the culture liquid. This yield corresponds to 58.6 wt. percent (52.2 mole percent) to the total amount of DL–PCA employed. It is assumed that, with respect to the yield of L-glutamic acid, the advantageous results obtained in this case are due to keeping the pH of the culture liquid within the range of 7 to 9.

In addition, after the passage of 48 hrs., no trace of D-glutamic acid was detected in the culture liquid by means of determination with D-glutamic acid oxidase prepared from *Aspergillus ustus*.

EXAMPLE 4

A nutrient medium of the following composition was prepared and adjusted to a pH of 7.

| | Percent |
|---|---|
| Ammonium salt of DL–PCA | 2 |
| DL–PCA | 1 |
| Glucose | 1 |
| $KH_2PO_4$ | 0.15 |
| $K_2HPO_4$ | 0.15 |
| $MgSO_4 \cdot 7H_2O$ | 0.005 |
| $MnSO_4$ | 0.001 |
| $FeSO_4 \cdot 7H_2O$ | 0.001 |
| Yeast extract | 0.001 |

50 cc. of this medium was charged in a flask of 500 cc. volume and shaken and sterilized. To this were inoculated the cells grown on bouillon agar slant of *Bacillus megatherium* Q–11. After addition of 1 g. of $CaCO_3$, incubation was carried out aerobically at 30° C. for 96 hrs., with shaking in the same manner as described in Example 1 and, as a result, 0.72 g./dl. of L-glutamic acid was obtained.

Since *Bacillus megatherium* Q–11 has a weak capacity to produce glutamic acid in a medium composed of glucose and ammonium salt, it is assumed that a greater part of the 0.72 g./dl. of L-glutamic acid produced is derived from both DL–PCA and its ammonium salt in the nutrient medium.

EXAMPLE 5

The same nutrient medium as in Example 4 except that glucose was omitted, was inoculated with cells of *Bacillus megatherium* G 17–4, and incubated aerobically in the same manner as in Example 4. After the passage of 96 hrs. 63 mg./dl. of L-glutamic acid was produced in the culture liquid.

EXAMPLE 6

A nutrient medium of the following composition was prepared and adjusted to a pH of 7.

| | Percent |
|---|---|
| DL–PCA | 0.5 |
| $KH_2PO_4$ | 0.15 |
| $K_2HPO_4$ | 0.15 |
| $MgSO_4 \cdot 7H_2O$ | 0.05 |
| $MnSO_4 \cdot nH_2O$ | 0.001 |
| $FeSO_4 \cdot 7H_2O$ | 0.001 |
| Yeast extract | 0.05 |
| $NH_4Cl$ | 0.5 |

50 cc. of this medium was charged in a flask of 500 cc. volume and shaken and sterilized. To this was inoculated a small amount of cells of *Bacillus megaterium* 6045. Afted addition of 1.5 g. of $CaCO_3$, incubation was carried out at 30° C. for 48 hrs. with shaking in the same manner as in Example 1 and, as a result, 0.1 g./dl. of L-glutamic acid was produced in the culture liquid.

EXAMPLE 7

A nutrient medium of the following composition was prepared and adjusted to pH 7.

| | Percent |
|---|---|
| D–PCA | 3 |
| $KH_2PO_4$ | 0.15 |
| $K_2HPO_4$ | 0.15 |
| $MgSO_4 \cdot 7H_2O$ | 0.05 |
| $MnSO_4 \cdot nH_2O$ | 0.001 |
| $FeSO_4 \cdot 7H_2O$ | 0.001 |
| Yeast extract | 0.05 |

50 cc. of this medium was charged in a flask of 500 cc. volume and shaken and sterilized. To this was inoculated a small amount of cells of *Bacillus megaterium* 6045. After addition of 1.5 g. of $CaCO_3$, incubation was carried out aerobically at 30° C. for 48 hrs. with shaking in the same manner as in Example 1 and, as a result, 0.48 g./dl. of L-glutamic acid was produced in the culture liquid. Since 1.9 g./dl. of the added D–PCA still remained in the culture liquid, the yield L-glutamic acid to D–PCA consumed was 43.6% by weight.

EXAMPLE 8

A nutrient medium of the following composition was prepared and adjusted to a pH of 8.5 by aqueous ammonia.

| | | |
|---|---|---|
| DL–PCA | percent | 2 |
| $KH_2PO_4$ | do | 0.1 |
| $MgSO_4 \cdot 7H_2O$ | do | 0.04 |
| Fe-ion | p.p.m. | 2 |
| Mn-ion | p.p.m. | 2 |
| Powder of amino acids | percent | 1 |

20 cc. of this medium was charged in a flask of 500 cc. volume and shaking and sterilized by heating at 110° C. for 2 mins. To this, ethanol was added to form a concentration of 0.5%, and then the cells from bouillon agar slant culture of *Pseudomonas alkaligenes* ATCC 12815 were inoculated. Incubation was thereafter carried out aerobically at 31° C. for 24 hrs. with shaking in the same manner as in Example 1.

Proliferation of cells was extremely remarkable, and after passage of 24 hrs., it was determined that 1.60 g./dl. of L-glutamic acid was in the culture liquid. When the amount of L-glutamic acid contained in the powder of amino acids employed for the medium was subtracted, the amount of the product was 1.53 g./dl. This corresponds to 75.7 wt. percent (67.5 mole percent) in yield for DI-PCA used as raw material.

We claim:

1. A method for preparing L-glutamic acid biochemically, comprising contacting at least one pyrrolidonecarboxylic acid selected from the group consisting of D-pyrrolidonecarboxylic acid and DL-pyrrolidonecarboxylic acid with enzymes of microorganisms in an aqueous medium at a pH of 5 to 10 at a temperature of 25–60° C. under aeration, said microorganisms being one from the family selected from the group consisting of Achromobacteriaceae, Micrococcaceae, Brevibacteriaceae, Corynebacteriaceae, Enterobacteriaceae, Pseudomonadaceae, Bacillaceae and Rhizobiaceae and having the capacity of producing at least 0.5 mg. of L-glutamic acid in the reaction mixture when 1 ml. of suspension of intact cells corresponding to 0.5–10 mg. of dried cells is mixed with 1 ml. of buffer solution of potassium phosphate at a pH of 6 to 9 and containing 20 mg. of D-pyrrolidonecarboxylic acid supplied as its ammonium salt and shaken at 30° C. for 12 to 72 hrs.

2. A method for preparing L-glutamic acid biochemically, comprising inoculating cells of a microorganism in an aqueous nutrient medium having a pH range of 5 to 9 and containing at least one pyrrolidonecarboxylic acid selected from the group consisting of D-pyrrolidonecarboxylic acid and DL-pyrrolidonecarboxylic acid, the culture liquid being maintained within a temperature range of 25–50° C. under stirring and aerating conditions, said microorganism being one from a family selected from the group consisting of Achromobacteriaceae, Micrococcaceae, Brevibacteriaceae, Corynebacteriaceae, Enterobacteriaceae, Pseudomonadaceae, Bacillaceae and Rhizobiaceae and having the capacity of producing at least 0.5 mg. of L-glutamic acid in the reaction mixture when 1 ml. of suspension in intact cells corresponding to 0.5–10 mg. of dried cells is mixed with 1 ml. of a buffer solution of potassium phosphate having a pH range of 6 to 9 and containing 20 mg. of D-pyrrolidonecarboxylic acid supplied as its ammonium salt and shaken at 30° C. for 12–72 hrs.

3. A method of preparing L-glutamic acid, comprising inoculating grown cells of a microorganism into an aqueous nutrient medium and incubating for 10–124 hours, mixing the obtained culture liquid with an aqueous solution containing at least one pyrrolidonecarboxylic acid selected from the group consisting of D-pyrrolidonecarboxylic acid and DL-pyrrolidonecarboxylic acid and maintaining the resulting mixture within a pH range of 5 to 10 and a temperature range of 25–60° C. under stirring and aerating condition, said microorganism being one from the family selected from the group consisting of Achromocaberiaceae, Micrococcaseae, Brevibacteriaceae, Corynebacteriaceae, Enterobacteriaceae, Pseudomonadaceae, Bacillaceae and Rhizobiaceae and having capacity of producing at least 0.5 mg. of L-glutamic acid in the reaction mixture when 1 ml. of suspension of intact cells corresponding to 0.5–10 mg. of dried cells is mixed with 1 ml. of a buffer solution of potassium phosphate having a pH of 6 to 9 and containing 20 mg. of D-pyrrolidonecarboxylic acid supplied as its ammonium salt and shaken at 30° C. for 12–72 hrs.

4. A method for preparing L-glutamic acid comprising inoculating cells of a microorganism in an aqueous nutrient medium and incubating for 10 to 124 hours, harvesting the cells by centrifugation from the culture liquid, mixing an aqueous solution containing at least one pyrrolidonecarboxylic acid selected from the group consisting of D-pyrrolidonecarboxylic acid and DL-pyrrolidonecarboxylic acid with the above-mentioned cells harvested by centrifugation, and maintaining the mixture within a pH range of 5 to 10 and a temperature range of 25 to 60° C. under stirring and aerating conditions, said microorganism being one from a family selected from the group consisting of Achromobacteriaceae, Micrococcaceae, Brevibacteriaceae, Corynebacteriaceae, Enterobacteriaceae, Pseudomonadeaceae, Bacillaceae and Rhizobiaceae and having a capacity of producing at least 0.5 mg. of L-glutamic acid in the reaction mixture when 1 ml. of suspension of intact cells corresponding to 0.5–10 mg. of dried cells is mixed with 1 ml. of a buffer solution of potassium phosphate having a pH of 6–9 and containing 20 mg. of D-pyrrolidonecarboxylic acid supplied as its ammonium salt and shaken at 30° C. for 12–72 hrs.

No references cited.

A. LOUIS MONACELL, *Primary Examiner.*

L. M. SHAPIRO, *Assistant Examiner.*